June 9, 1925.

Re. 16,094

O. R. ERWIN

FIRE EXTINGUISHING APPARATUS

Original Filed Nov. 12, 1920

INVENTOR

Orlando R. Erwin

BY

Jeffery, Kimball & Eggleston

ATTORNEYS

Reissued June 9, 1925.

Re. 16,094

UNITED STATES PATENT OFFICE.

ORLANDO R. ERWIN, OF MILWAUKEE, WISCONSIN, ASSIGNOR TO FOAMITE-CHILDS CORPORATION, OF NEW YORK, N. Y., A CORPORATION OF DELAWARE.

FIRE-EXTINGUISHING APPARATUS.

Original No. 1,437,097, dated November 28, 1922, Serial No. 423,510, filed November 12, 1920. Application for reissue filed November 25, 1924. Serial No. 752,271.

*To all whom it may concern:*

Be it known that I, ORLANDO R. ERWIN, a citizen of the United States, and resident of Milwaukee, Wisconsin, and formerly of Forest Hills, in the county of Queens and State of New York, have invented certain new and useful Improvements in Fire-Extinguishing Apparatus, of which the following is a specification.

My invention relates to fire extinguishing apparatus, and more particularly to apparatus of the type wherein chemical solutions are stored and are adapted to be co-mixed to produce a fire extinguishing foam, and has special reference to the provision of a novel container for storing and mixing the said solutions.

It has been found desirable in apparatus of the type referred to, to provide a container which shall be of simple construction, which shall provide for solution containers substantially sealed to eliminate evaporation and substantially splash-proof to facilitate handling of the extinguisher and which shall embody a construction yielding simplicity in both the charging and discharging operations, such construction to be made of the fewest of parts to provide a relatively inexpensive fire fighting unit.

The principal objects of the present invention therefore involve, in addition to the provision of the container having these characteristics, the provision of a portable container adapted to be operated by inverting the container, the said container being sub-divided into distinct solution and mixing chambers, involving simplicity of parts in construction; the provision of such a container permitting an efficient flow by gravity of the solutions into the mixing chamber and the provision of simple and efficient equalizing pressure means associated with such a subdivided container.

To the accomplishment of the foregoing and such other objects as may hereinafter appear, my invention consists in the elements and their relation one to the other, as hereinafter particularly described and then sought to be defined in the claims, reference being had to the accompanying drawings showing a preferred embodiment of my invention and in which—

Figure 1:
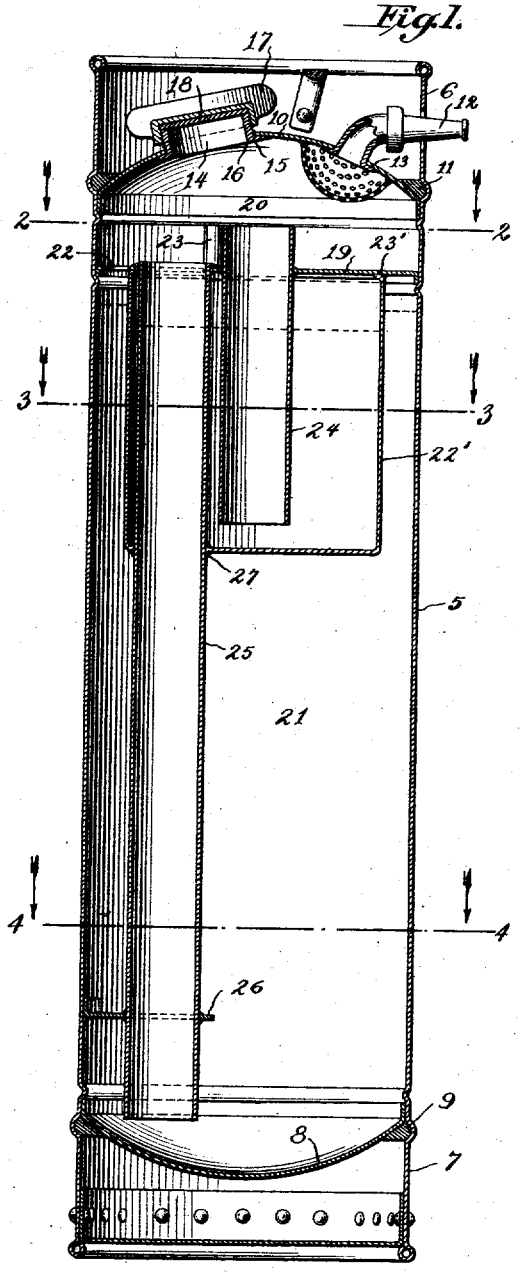
Figure 1 is an elevational view in cross section of my container.
Figure 2:
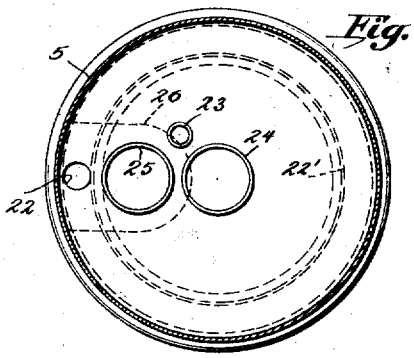
Figure 2 is a cross sectional view of line 2—2, Figure 1.
Figure 3:
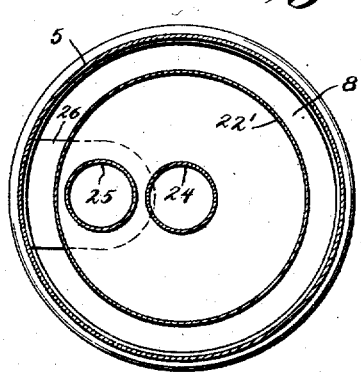
Figure 3 is a cross sectional view of line 3—3, Figure 1.
Figure 4:
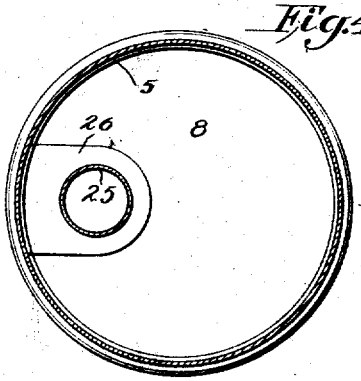
Figure 4 is a cross sectional view of line 4—4, Figure 1.

Referring to the drawings, the outer surface of the container comprises preferably a cylindrical body 5, having integrally formed therewith cylindrical end supporting sections 6 and 7, these sections adapted to be supported on any surface, with the apparatus either in erect or inverted position. The container is provided preferably with a dished portion 8 forming the bottom thereof, this portion being connected to the interior surface of the body portion 5 in any suitable manner, as by brazing at 9. The container is provided with a dome portion 10 comprising the top of the container, said dome portion being also connected to the interior surface of the body portion of the container in any suitable manner, as by brazing at 11, this dome portion being provided with apertures for charging and discharging purposes. Fitted in the discharging aperture is a nozzle 12, connected in any desirable way with the dome, as by brazing flange portion 13 of said nozzle to the interior surface of the dome.

Means is provided for permitting charging of the container, which consists preferably of a thimble 14 having an outwardly directed flange portion 15 connected to the interior surface of the dome, as by being brazed thereto, said thimble being provided also with a threaded neck 16 on which is screwed an internally threaded cap 17, a gasket 18 being preferably provided between the cap and the thimble to secure an efficient closure.

It has been found that an efficient apparatus of this nature should contain, besides the solution chambers, a separate mixing chamber communicating with the solution chambers, so that the effective generated foam may be discharged directly from the mixing chamber without further encountering the solutions in transit. The container is therefore subdivided into three chambers comprising two solution chambers and a mixing chamber. The container may be thus subdivided in any desired manner, the preferred way being shown in the drawings, in which is provided a partition preferably in the form of a disk 19, connected to the interior surface of the cylindrical portion of the container in any desired manner, as by brazing the periphery of said disk to the container, this dividing the container into an upper mixing portion 20 and a lower body portion 21, said disk being provided with solution outlets 22 and 23, these outlets comprising interconnecting means between the mixing chamber 20 and solution chambers in the body portion. The body portion of the container may be subdivided in any desired manner into the two necessary solution chambers, the preferred embodiment shown in the drawings consisting of an open-ended compartment 22′, adapted to contain the A or acid solution, being fitted to the disk 19 in any suitable manner, as by brazing an internally directed flange portion of the compartment to the bottom surface of said disk as at 23′, this compartment dividing the body portion into the A or acid chamber and the B or base chamber 21. In order to provide for an efficient flow, i. e a uniform, non-gurgling flow in the right proportions of the solutions from the solution chambers 21 and 22 into the mixing chamber 20, means is provided for promptly equalizing the pressure of the generated foam on the solutions in the said chamber, said means consisting preferably of equalizing pressure pipes 24 and 25 of considerable cross-section, providing free communication between the mixing chamber and the said solution chambers. The equalizing pressure pipes 24 and 25 are preferably connected as shown in the drawings to the disk 19 in any desirable manner, as by soldering or brazing, these equalizing pressure pipes in the preferred form extending to the bottom of the respective solution chambers so that upon inversion of the apparatus the foam generated in the mixing chamber will expand and move up the full length of the pipes into the then top of the solution chambers and provide immediately an equalizing pressure on the top surface of said solutions to counteract the pressure of the foam in the mixing chamber on the solutions entering through the solution outlets.

Means is provided preferably for supporting the equalizing pressure pipe 25, which consists in a supporting bracket 26 fixed to the interior surface of the container 5 near its bottom, said pipe being also preferably connected as by brazing to the bottom portion of compartment 22, as shown at 27.

The solution containers 21 and 22 constructed in this manner are substantially sealed against evaporation of the solutions and against splashing in handling of the container. To further provide a splash-proof effect, solution outlet 23 and equalizing pressure pipe 25 communicating with acid chamber 22 are preferably made to extend upwardly into the mixing chamber as shown in the drawings.

In operation, in charging the device, cap 17 is removed and the acid and basic solutions are poured into their respective compartments 22 and 21 through the equalizing pressure pipes 24 and 25, the air trapped in the said compartments having passage through the solution outlets 22 and 23. After charging, the cap is screwed on the thimble, and the container is then stored with the contents effectively sealed against evaporation, the solution compartments being substantially closed. The apparatus may be easily handled and transported from place to place without liability of splashing or of accidental intermixture of the solutions, due to the compartments being substantially sealed.

In the event of fire emergencies, the apparatus is inverted with the cylindrical end portion 6 resting on the supporting surface, the solutions flowing freely through the outlets 22 and 23 at the rates predetermined by their relative diameters, and upon admixture in chamber 20 generate a foam, part of which moves up in the equalizing pressure pipes, filling the now upper portions of the solution compartments and equalizing the pressure of the generated foam on the solutions at the outlets of the compartments. The mixing chamber rapidly fills with the foam under pressure, which foam is now free without further mixing with the solutions to discharge from the nozzle 12 on to the fire to be extinguished.

The mixture takes place gradually due to the regulated flow through the solution outlets, this preventing pressure strains in the container and this also resulting in a thorough mixture of the two solutions.

Particular attention is directed to the fact that the mixing chamber is constituted of one end portion of the main container, being of the full diameter thereof which arrangement provides first, a large space and the necessary time period for the proper mixing of the solutions and development of foam by the chemical reaction, it having been found that a chamber of considerable capacity is practically essential to prevent the discharge of unmixed solutions in liquid form, and second, this arrangement provides an area for the partition plate 19 which is adequate to accommodate pressure-equalizing pipes of large cross sectional area, large enough for readily passing the pressure medium, constituted of the sticky foam, from the mixing chamber into the opposite ends of the solution chambers to obtain quickly the desired balance of pressure, thereby ensuring the smooth or non-gurgling, and hence uniformly proportionate, flow of the solutions into the mixing chamber. This results in the production and delivery of foam of constant character as to its condition of alkalinity or acidity, because the solution outlets (22 and 23) can be relatively proportioned so that the foam is neutral or slightly alkaline and therefore harmless to clothing, housefurnishings, etc. and this condition is maintained throughout the whole discharge.

While I have shown my device in the preferred form, it will be obvious that many changes and modifications may be made in the structure disclosed without departing from the spirit of the invention, defined in the following claims.

I claim:

1. A fire extinguishing apparatus adapted by inverting the apparatus for the co-mixing of chemical solutions to produce a fire extinguishing foam, including an integral container divided into a plurality of chambers comprising solution chambers, each provided with a solution outlet and an equalizing pressure inlet, and a mixing chamber communicating with the inlets and outlets of the said solution chambers.

2. A fire extinguishing apparatus comprising an outer shell, a disk or plate attached interiorly to said shell, the said plate subdividing the shell into a top and bottom portion, a receptacle hung from the said plate, the said receptacle separating the bottom portion of the shell into two solution chambers, the upper portion of the shell defining a mixing chamber, orifices in said plate defining solution outlets for the said solution chambers and equalizing pressure inlets in said plate for both solution chambers.

3. A fire extinguishing apparatus comprising a container subdivided into a plurality of chambers including solution chambers each provided with a solution outlet and an equalizing pressure inlet and a mixing chamber communicating with the inlets and outlets of the solution chambers, said mixing chamber being provided with charging and discharging openings, and a closure for the charging opening.

4. A fire extinguishing apparatus comprising an outer shell, a disk or plate attached interiorly to said shell, the said plate subdividing the shell into a top and bottom portion, a receptacle hung from the said plate, the said receptacle separating the bottom portion of the shell into two solution chambers, the upper portion of the shell defining a mixing chamber, orifices in said plate defining solution outlets for the said solution chambers and equalizing pressure inlets in said plate for both solution chambers; said mixing chamber being provided with charging and discharging openings and a closure for the charging opening.

5. In a fire extinguishing apparatus adapted to be rendered active by inversion of the apparatus, an integral container comprising solution chambers formed in the body of the container and having solution outlets and equalizing pressure inlets, and a mixing chamber formed in the top thereof and communicating with the inlets and outlets of the solution chambers, whereby upon inversion of the apparatus, the solutions will flow by gravity into the mixing chamber, there to generate fire extinguishing foam.

6. In a fire extinguishing apparatus, a container subdivided into a plurality of chambers comprising solution chambers formed in the body of the container and having solution outlets and equalizing pressure inlets, and a mixing chamber formed in the top of the container and communicating with the inlets and outlets of the solution chambers, said mixing chamber being provided with charging and discharging openings, and a closure for the charging opening.

7. In a fire extinguishing apparatus adapted to be rendered active by inversion of the apparatus, an integral container comprising solution chambers formed in the body thereof and having solution outlets and a mixing chamber formed in the top thereof communicating with said outlets, and equalizing pressure means connecting the mixing chamber with said solution chambers.

8. In a fire extinguishing apparatus adapted to be rendered active by the inversion of the apparatus, an integral container comprising solution chambers formed in the body thereof and having solution outlets and a mixing chamber formed in the top thereof communicating with said outlets, and equalizing pressure means connecting the mixing chamber with the bottoms of said solution chambers.

9. In a fire extinguishing apparatus adapted to be rendered active by the inversion of the apparatus, an integral container comprising solution chambers formed in the body thereof and having solution outlets and a mixing chamber formed in the top thereof communicating with said outlets, and equalizing pressure means connecting the mixing chamber with the bottoms of said solution chambers, said means extending into the mixing chamber.

10. An invertible, foam-type extinguisher comprising outer and inner receptacles respectively containing the foam-making solutions, and a mixing chamber formed in one end of said outer receptacle and of substantially the full diameter thereof, pressure balancing means for establishing uniform or non-gurgling solution flow into said mixing chamber at predetermined relative rates, and a foam discharge nozzle for said mixing chamber.

11. An invertible, foam-type extinguisher comprising outer and inner receptacles respectively containing foam-making solutions, a mixing chamber formed in one end of said outer receptacle and of substantially the full diameter thereof, said mixing chamber having an opening in the wall thereof and a removable cap applied to said opening, pressure balancing means for establishing uniform or non-gurgling flow of said solutions at predetermined relative rates from each receptacle into said mixing chamber, and a foam discharge outlet for said mixing chamber.

12. An invertible foam-type extinguisher comprising a main container having a charging opening and cap to close the same, and a transverse partition fixed to said container intermediate the ends thereof and spaced from said opening and cap and forming a foam-development chamber, two chambers in said main container respectively holding the foam-forming solutions, each having a solution outlet into said foam-development chamber, pressure balancing means adapted to produce smooth or non-gurgling solution flow into said foam-development chamber, and a foam discharge outlet for said chamber.

13. An invertible foam-type extinguisher comprising a main container having an opening and cap, and a transverse partition forming a foam-development chamber of substantially the full diameter of said main container, two other chambers in said main container respectively holding the two foam-forming solutions, both having solution outlets opening into said foam-development chamber at one side of the center thereof, pressure balancing means adapted to produce smooth or non-gurgling solution flow into the foam-development chamber, and a foam discharge outlet for said latter chamber, opening therefrom on the side thereof which is opposite said solution outlets.

14. An invertible, foam-type extinguisher comprising a main container having a mixing and foam-development chamber provided with an opening and cap and with a foam outlet independent of said cap and having two other chambers respectively holding the foam-forming solutions, each of the latter chambers having a solution outlet into said mixing chamber, pressure balancing means adapted to produce smooth or non-gurgling flow of said solutions through said outlets, said means including foam-conducting pipes extending from the mixing chamber into the solution chambers, both said pipes forming free foam-conducting passages adapted and operating to permit the outflow from said solution chambers to take place proportionally to the sizes of their respective solution outlets.

Signed at Milwaukee in the county of Milwaukee and State of Wisconsin this 19th day of November, A. D. 1924.

ORLANDO R. ERWIN.